United States Patent
Hasegawa

(10) Patent No.: US 9,572,076 B2
(45) Date of Patent: Feb. 14, 2017

(54) WIRELESS COMMUNICATION TERMINAL

(71) Applicant: Hitachi Kokusai Electric Inc., Tokyo (JP)

(72) Inventor: Keigo Hasegawa, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 0 days.

(21) Appl. No.: 15/198,069

(22) Filed: Jun. 30, 2016

(65) Prior Publication Data

US 2016/0309381 A1 Oct. 20, 2016

Related U.S. Application Data

(63) Continuation-in-part of application No. PCT/JP2015/051859, filed on Jan. 23, 2015.

(30) Foreign Application Priority Data

Feb. 28, 2014 (JP) .................................. 2014-039086

(51) Int. Cl.
| | | |
|---|---|---|
| H04W 36/08 | (2009.01) | |
| H04W 48/20 | (2009.01) | |
| H04W 36/22 | (2009.01) | |
| H04W 36/30 | (2009.01) | |

(52) U.S. Cl.
CPC ............ *H04W 36/08* (2013.01); *H04W 36/22* (2013.01); *H04W 36/30* (2013.01); *H04W 48/20* (2013.01)

(58) Field of Classification Search
None
See application file for complete search history.

(56) References Cited

U.S. PATENT DOCUMENTS

| | | | | |
|---|---|---|---|---|
| 2007/0225014 A1* | 9/2007 | Kurose | ................. | H04W 48/20 455/452.2 |
| 2009/0275337 A1* | 11/2009 | Maeda | ................. | H04W 36/18 455/442 |
| 2010/0322167 A1 | 12/2010 | Kurose | | |
| 2011/0188442 A1 | 8/2011 | Nakamura et al. | | |
| 2012/0243460 A1* | 9/2012 | Muto | ...................... | H04L 45/22 370/315 |
| 2015/0098392 A1* | 4/2015 | Homchaudhuri | ..... | H04W 48/20 370/329 |

(Continued)

FOREIGN PATENT DOCUMENTS

| | | |
|---|---|---|
| JP | 2005-033285 A | 2/2005 |
| JP | P009-212817 A | 9/2009 |

(Continued)

OTHER PUBLICATIONS

"Importance of Serving Cell Association in Heterogeneous Networks", 3GPP R1-100701, Jan. 18, 2010, Spain.

(Continued)

*Primary Examiner* — Mohammad Adhami
(74) *Attorney, Agent, or Firm* — Brundidge & Stanger, P.C.

(57) ABSTRACT

The present invention provides a wireless communication terminal which can flexibly select a base station according to communication quality and a load status and improve communication quality which a user experiences in a wireless communication system which does not include a handover mechanism and is not notified of availability of radio resources from each base station.

3 Claims, 4 Drawing Sheets

SELECTION OF BASE STATION DURING ACTIVATION

(56) References Cited

U.S. PATENT DOCUMENTS

| 2015/0111575 | A1* | 4/2015 | Lei | H04W 36/08 |
| | | | | 455/436 |
| 2015/0131483 | A1* | 5/2015 | Colban | H04W 48/16 |
| | | | | 370/254 |
| 2015/0350974 | A1* | 12/2015 | Patil | H04W 36/0083 |
| | | | | 370/331 |

FOREIGN PATENT DOCUMENTS

| JP | 2011-004262 A | 1/2011 |
| JP | 2011-199402 A | 10/2011 |
| JP | 2002-359864 A | 12/2012 |
| JP | 2012-238930 A | 12/2012 |
| WO | 2009/096406 A1 | 8/2009 |

OTHER PUBLICATIONS

International Search Report and Written Opinion from International Application No. PCT/JP2015/051859 mailed Mar. 17, 2015.

* cited by examiner

CONFIGURATION EXAMPLE OF ENTIRE SYSTEM

CONFIGURATION OF TERMINAL ACCORDING TO PRESENT EMBODIMENT

SELECTION OF BASE STATION DURING ACTIVATION

EXPECTED TRANSMISSION RATE CALCULATION PROCESSING

PROCESSING AFTER OPERATION STARTS

WIRELESS COMMUNICATION TERMINAL

CLAIM OF PRIORITY

The present application claims priority from Japanese patent application JP 2014-039086 filed on Feb. 28, 2014, the content of which is hereby incorporated by reference into this application.

BACKGROUND ARTS

The present invention relates to a wireless communication terminal in a wireless access system which uses a frequency of a white space. More particularly, the present invention relates to a wireless communication terminal which can flexibly select a base station according to communication quality and a load status of the base station to connect to even in a system in particular which does not include a handover function.

Background Art

Explanation of Prior Art

Recent development of an information society is truly remarkable, and not only wired communication but also wireless communication are frequently used as communication methods of information communication devices and services.

In response to this development, mobile telephone and mobile data communication operators try to accommodate traffic by increasing base stations of various large and small cell sizes and introducing a new communication method.

Further, a technique of making secondary use of a frequency which is called a white space which is temporarily or spatially not used in a license band, or a heterogeneous cognitive wireless technique of causing a terminal including a plurality of communication methods to select an optimal communication method among base stations including a plurality of communication methods or base stations of different communication methods are also being developed.

Thus, a wireless communication terminal (referred to as a "terminal" below) needs to realize communication of interest while dynamically selecting a frequency, timing, a communication method and a connection destination.

When a terminal selects to which base station to connect to perform communication, the terminal uses a cell load status, i.e., the degree of congestion or availability of a cell as a cell selection criterion.

According to a Worldwide Interoperability for Microwave Access (WiMAX) system, a base station broadcasts availability of radio resources (Available Radio Resource) on a regular basis. Consequently, each terminal can obtain availability from each base station before connection, and determine whether or not to connect to the base station based on the availability.

Consequently, when accesses concentrate on a given base station, each terminal can access to another base station whose resources are available.

Handover

Further, many cellular systems which assume mobile communication such as Long Term Evolution (LTE) and WiMAX each have a mechanism (handover) which switches connection to a base station of good communication quality or a base station of a low degree of congestion (load) while maintaining a connection state of each terminal.

Hence, even when each terminal connects to a base station of poor communication quality or a base station of a high degree of congestion during initial connection, it is possible to switch connection to a base station of a low degree of congestion by performing handover.

There are a system which supports each base station to start handover and a system which supports each terminal to start handover.

System Which Does Not Assume Handover

However, some systems do not assume handover.

For example, according to IEEE 802.22 which is new wireless method standards for using a white space, and which is a wireless communication system for fixed stations, each antenna is installed by adjusting directionality of each antenna for a base station to which each terminal needs to connect when each terminal is installed.

Hence, at a point of time of installation or at a point of time of initial connection, each terminal and a base station to which each terminal connects are fixed. Therefore, it is not possible to switch a base station according to communication quality and the degree of congestion after communication starts.

Further, an interface which obtains the degree of congestion is not defined, either, and therefore each base station does not notify each terminal of radio resource availability information unlike WiMAX or the like.

Related Art

In addition, techniques related to wireless communication systems include JP 2005-33285 A, "WIRELESS INFORMATION TERMINAL AND WIRELESS COMMUNICATION SYSTEM" (Hitachi, Ltd., Patent Literature 1), JP 2009-212817 A, "MOBILE STATION, PROCESSING MODULE, WIRELESS COMMUNICATION SYSTEM, AND CONNECTION ESTABLISHING METHOD", (NTT DOCOMO, INC., Patent Literature 2), JP 2011-4262 A, "MOBILE WIRELESS TERMINAL DEVICE", (TOSHIBA CORPORATION, Patent Literature 3), and 3GPP R1-100701 Importance of Serving Cell Association in Heterogeneous Networks, 2010 (Non Patent Literature 1).

Patent Literature 1 discloses that an access point gives congestion information and received field intensity information to a wireless information terminal, and a user of the wireless information terminal selects an optimal access point based on these pieces of information.

Patent Literature 2 discloses that a mobile station repeatedly determines normality of communication connection according to whether or not it is possible to extract a downlink data reception control signal within a predetermined time after the communication connection is established, searches a radio frame again when it is not possible to extract the downlink data reception control signal, and maintains communication by using a newly extracted downlink data reception control signal.

Patent Literature 3 discloses that a mobile wireless terminal device receives not only a reception power level but also a system bandwidth and downlink map information, calculates the degree of congestion based on the reception power level, the system bandwidth and the downlink map information, calculates a predicted rate and notifies a user of the predicted rate.

Non Patent Literature 1 discloses that, in an LTE (Long Term Evolution) system, when a wireless communication terminal selects a base station to connect to from a plurality of base stations, the wireless communication terminal generally connects to a base station of the highest reception power, yet performing relay and transmission by using a base station of low transmission power can sometimes provide a higher throughput depending on conditions such as backhaul link quality (link capacity) of a base station and interferences from neighboring cells.

SUMMARY OF THE INVENTION

Technical Problem

As described above, there is a problem that, in a conventional wireless communication system which uses a white space, a wireless communication terminal cannot select or switch a base station according to the degree of congestion (load status), and cannot flexibly select a base station and further improve communication quality (Quality of Experience: QoE) which a user experiences.

In addition, Patent Literatures 1 to 3 and Non Patent Literature 1 do not disclose that, in a wireless system which does not include a handover function, each terminal calculates available resource amount×coding rate or (1/the number of terminals)×coding rate as an index indicating a cell resource use status, and connects to a base station of a maximum index value.

The present invention has been made in light of the above situation, and an object of the present invention is to provide a wireless communication terminal which can flexibly select a base station according to communication quality and a load status and improve communication quality which a user experiences even in a wireless communication system which does not include a handover mechanism.

Solution to Problem

The present invention which solves the above problem of the conventional example is a wireless communication terminal in a wireless communication system which does not include a handover function, and includes: a baseband signal processing unit which calculates communication quality based on a received signal from a connectable base station; a MAC processing unit which obtains an average available resource amount as a resource use status from MAC information received from the base station; a base station selecting unit which calculates a first index value as an index value of an expected transmission rate by multiplying a coding rate and the average available resource amount, and selects a base station of the first maximum index value as a connection destination, while the expected transmission rate is expected when connection to the base station is established and the coding rate is a combination of a modulation method and a coding method matching the communication quality; and a main control unit which performs control to connect to the selected base station.

Further, the present invention is a wireless communication terminal in a wireless communication system which does not include a handover function, and includes: a baseband signal processing unit which calculates communication quality based on a received signal from a connectable base station; a MAC processing unit which obtains a number of terminals per unit time as a resource use status from MAC information received from the base station; a base station selecting unit which calculates a second index value as an index value of an expected transmission rate by dividing a coding rate by the number of terminals, and selects a base station of the maximum second index value as a connection destination, while the expected transmission rate is expected when connection to the base station is established and the coding rate is a combination of a modulation method and a coding method matching the communication quality; and a main control unit which performs control to connect to the selected base station.

Furthermore, the present invention is the above wireless communication terminal, and, in a state where connection to a base station is established, a base station selecting unit calculates an index value of an expected transmission rate for another connectable base station other than the base station, and selects the another base station as a connection destination when the expected transmission rate of the another base station is higher than that of the connected base station, and a main control unit performs control to disconnect the connection with the connected base station, and connect to the another base station.

Advantageous Effects of Invention

The present invention is a wireless communication terminal in a wireless communication system which does not include a handover function, and includes: a baseband signal processing unit which calculates communication quality based on a received signal from a connectable base station; a MAC processing unit which obtains an average available resource amount as a resource use status from MAC information received from the base station; a base station selecting unit which calculates a first index value as an index value of an expected transmission rate by multiplying a coding rate and the average available resource amount, and selects a base station of the maximum first index value as a connection destination, while the expected transmission rate is expected when connection to the base station is established and the coding rate is a combination of a modulation method and a coding method matching the communication quality; and a main control unit which performs control to connect to the selected base station. It is possible to provide an effect that, even in a system which does not include a handover function and is not notified of availability of resources from each base station, the wireless communication terminal can flexibly select a base station to connect to according to communication quality and a cell resource use status, provide good communication service and improve quality of experience of a user.

Further, the present invention is a wireless communication terminal in a wireless communication system which does not include a handover function, and includes: a baseband signal processing unit which calculates communication quality based on a received signal from a connectable base station; a MAC processing unit which obtains a number of terminals per unit time as a resource use status from MAC information received from the base station; a base station selecting unit which calculates a second index value as an index value of an expected transmission rate by dividing a coding rate by the number of terminals, and selects a base station of the maximum second index value as a connection destination, while the expected transmission rate is expected when connection to the base station is established and the coding rate is a combination of a modulation method and a coding method matching the communication quality; and a main control unit which performs control to connect to the selected base station. It is possible to provide an effect that, even in a system which does not include a handover function and is not notified of availability of resources from each base station, the wireless communication terminal can flexibly select a base station to connect to according to communication quality and a cell resource use status, realize good communication service and improve quality of experience of a user.

Further, the present invention is the above wireless communication terminal in which, in a state where connection to a base station is established, a base station selecting unit calculates an index value of an expected transmission rate for another connectable base station other than the base station, and selects the another base station as a connection destination when the expected transmission rate of the another base station is higher than that of the connected base station, and a main control unit performs control to disconnect the connection with the connected base station, and connect to the another base station. Consequently, it is possible to provide an effect that, even after the operation starts, the wireless communication terminal can connect to an optimal base station at all times according to a situation, and realize better communication service.

DESCRIPTIONS OF EMBODIMENTS

An embodiment of the present invention will be described with reference to the drawings.

Outline of Embodiment

In a cellular system which does not include a handover mechanism, a wireless communication terminal (a terminal according to the present embodiment) according to an embodiment of the present invention receives, from a connectable base station, resource allocation information of each terminal to notify each terminal in a cell from the connectable base station during initial connection to the base station. Further, the wireless communication terminal estimates each cell load status (resource use status). Furthermore, the wireless communication terminal calculates an expected transmission rate based on a load status and communication quality. Still further, the wireless communication terminal selects a base station of a maximum expected transmission rate, and establishes initial connection. Consequently, in a fixed communication system which does not perform handover, the wireless communication terminal can select a base station according to not only communication quality but also the degree of congestion and provide good communication service for a user.

Further, the wireless communication terminal according to the embodiment of the present invention calculates an expected transmission rate by measuring communication quality of another connectable base station and estimating a load status while communication is not performed or on a regular basis in a state where the wireless communication terminal is connected to a given base station. Furthermore, the wireless communication terminal disconnects connection with the currently connected base station when there is a base station whose expected transmission rate is higher than that of the currently connected base station and which is suitable for communication, and switches the connection to a more suitable base station. Consequently, the wireless communication terminal can flexibly switch the base station according to a situation, and provide better communication service.

Figure 1:
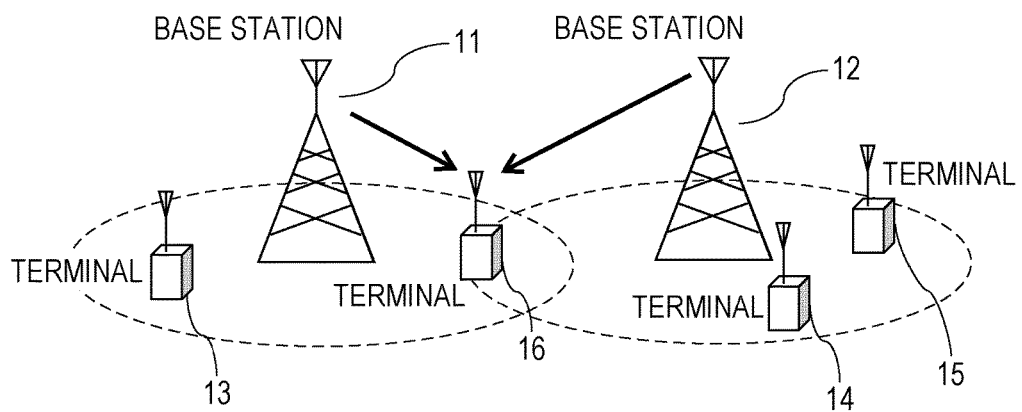
FIG. 1 illustrates an explanatory view of a configuration example of a wireless communication system including wireless communication terminals according to an embodiment of the present invention.

<Configuration of Wireless Communication System: FIG. 1>

An entire configuration of a wireless communication system (a wireless communication system according to the present embodiment) including wireless communication terminals according to the embodiment of the present invention will be described with reference to FIG. 1. FIG. 1 illustrates an explanatory view of a configuration example of the wireless communication system including the wireless communication terminals according to the embodiment of the present invention.

As illustrated in FIG. 1, the wireless communication system according to the present embodiment is a cellular system and includes, for example, base stations 11 and 12 and wireless communication terminals (referred to as terminals below) 13, 14, 15 and 16.

The wireless communication system according to the present embodiment is a wireless communication system which does not include a handover function, and is, for example, a fixed communication system according to IEEE 802.22 which uses white spaces.

The base stations 11 and 12 perform wireless communication with each terminal in cells managed by the base stations 11 and 12 according to IEEE 802.22.

The base stations 11 and 12 avoid an inter-cell interference according to a frequency division method for operating cells at different frequencies in one case, and avoid an interference according to a time division method for dividing an active timing (active frame) of each cell by a Selfcoexistence function which realizes coexistence with other neighboring cells in the other case.

The frequency division method is effective in case where there are multiple available channels in a system. The time division method is effective in case where there is only one available channel or in case where there are a small number of available channels compared to the number of cells.

Further, the terminals 13, 14, 15 and 16 according to the embodiment of the present invention are characteristic components of this system, and are fixed and installed to communicate with one of base stations according to IEEE 802.22.

In an example in FIG. 1, the terminal 13 connects with the base station 11, and the terminals 14 and 15 connect with the base station 12.

The terminal 16 is positioned in both cells of the base station 11 and the base station 12, and therefore can connect with both of the cells. In such a case, the terminal according to the present embodiment estimates not only communication quality but also status of resource use in the cells, selects a cell which is highly likely to be able to realize high speed communication based on the communication quality and the status of resource use, and connects with the cell.

Figure 2:
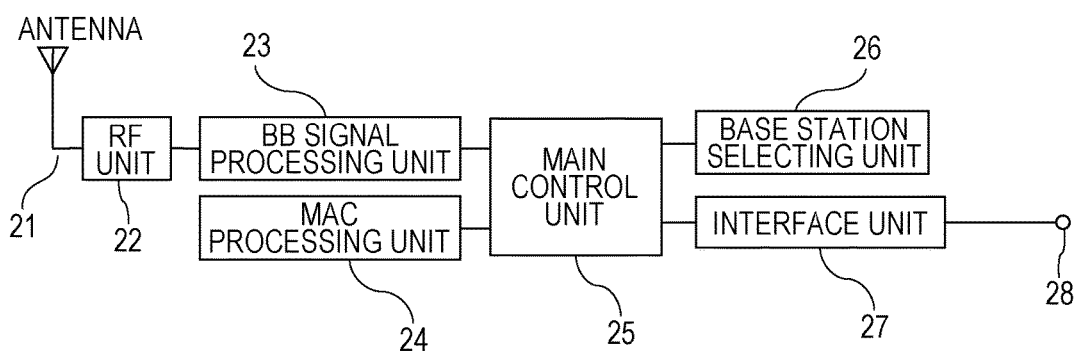
FIG. 2 illustrates a configuration block diagram of terminals 13 to 16.

<Configuration of Terminal: FIG. 2>

Next, each configuration of the terminals 13 to 16 will be described with reference to FIG. 2. FIG. 2 illustrates a configuration block diagram of the terminals 13 to 16. In addition, all terminals 13 to 16 employ the same configuration, and therefore the terminal 13 will be described below.

As illustrated in FIG. 2, a basic configuration of the terminal 13 is the same as that of each terminal in a conventional IEEE 802.22 system, and includes an antenna unit 21, an RF unit 22, a baseband signal processing unit (BB signal processing unit) 23, a MAC (Media Access Control) processing unit 24, a main control unit 25, an interface unit 27 and an external network terminal 28.

Further, the terminal 13 includes a base station selecting unit 26 as a component different from those of a conventional system, and an operation of selecting a base station in the base station selecting unit 26 is characteristic. Processing of the base station selecting unit 26 will be described below.

Each unit will be more specifically described.

The antenna unit 21 transmits and receives radio waves, and is a non-directional antenna which does not have directionality in a specific direction, which is a characteristic portion of the terminal according to the present embodiment.

The non-directional antenna enables flexible selection of a base station without limiting a connection destination to a specific base station, and makes an antenna installation work easy.

The RF unit 22 converts a baseband signal into a high frequency signal of a radio frequency band, and converts a high frequency signal into a baseband signal.

The baseband signal processing unit 23 performs error correction coding/decoding processing, and modulation/demodulation processing. Further, the baseband signal processing unit 23 measures reception power and measures communication quality such as a CINR (Carrier-to-Interference and Noise Ratio).

The MAC processing unit 24 performs processing of controlling a frequency channel or a data transmission/reception timing used by the terminal, adding an identifier of the terminal to a packet and recognizing (identifying or specifying) a data transmission source radio device.

Further, the MAC processing unit 24 obtains an average available resource amount and the number of terminals per unit time as information indicating a resource use status from the received MAC information.

The main control unit 25 intensively controls each unit and controls an entire device, and plays a role of an interface between each unit.

Further, the main control unit 25 determines a combination of a modulation method and an error correction code based on communication quality measured by the baseband signal processing unit 23, and notifies the baseband signal processing unit 23 of the combination.

Furthermore, the main control unit 25 outputs instructions to the MAC processing unit 24 and the baseband signal processing unit 23 to connect to the base station selected by the base station selecting unit 26 described below.

The interface unit 27 is an interface which exchanges data to and from an external network.

The external network terminal 28 is a terminal which connects to the external network.

The base station selecting unit 26 is a characteristic component of the terminal according to the present embodiment, and performs processing of selecting a base station with which the terminal connects.

More specifically, the base station selecting unit 26 estimates each cell resource use status (load status) based on information of reception power and communication quality such as a CINR provided from the baseband signal processing unit 23 based on received signals from a plurality of base stations, and resource allocation information provided from the MAC processing unit 24, and selects the most suitable base station for connection based on the communication quality and the resource use status. The operation of the base station selecting unit 26 will be described below.

<Expected Transmission Rate>

The base station selecting unit 26 of the terminal according to the present embodiment compares a transmission rate (expected transmission rate) which can be expected when connection to the base station is established, per connectable cell when selecting the base station.

More specifically, the base station selecting unit 26 calculates and compares an index value indicating an expected transmission rate of each base station based on communication quality and a resource use status, and selects an optimal base station (cell).

The base station selecting unit 26 of the terminal according to the present embodiment can calculate two types of index values as indices of expected transmission rates.

<Index Value of Expected Transmission Rate (1)>

First, a first index value will be more specifically described.

The first index value is given according to the following equation.

$$\text{First index value} = \text{average available resource amount} \times \text{coding rate}$$

The average available resource amount is information obtained from MAP information, and is an unused resource size per unit time. For example, the average available resource amount is the number of unused subcarriers per second in each cell.

Further, a coding rate is a total coding rate in case where a combination of a modulation method and an error correction coding method which are applicable based on an average reception power value or an average CINR value measured by the baseband signal processing unit 23.

When, for example, an average available resource amount of a given cell is 1000000 slots (1 subcarrier×1 OFDM symbol) per second, and it is possible to use for a modulation method 64 QAM (Quadrature Amplitude Modulation) which can transmit 6 bits per slot and use 5/6 for a coding rate of an error correction code, an entire coding rate is 5 bits/slot, and therefore the first index value of this cell is 1000000×5=5000000 bits/sec.

Further, the base station selecting unit 26 calculates and compares the first index value of each connectable cell, determines that, as a value of the first index value is larger, a cell load is lower and an expected transmission rate is higher, selects a cell of the highest first index value and notifies the main control unit 25 of a selection result.

<Index Value of Expected Transmission Rate (2)>

Next, a second index value will be more specifically described.

The second index value is given according to the following equation.

$$\text{Second index value} = (1/\text{the number of terminals}) \times \text{coding rate}$$

The number of terminals is the number of terminals observed in a predetermined observation period, and is the number of terminal IDs (Station IDs) or is the number of terminal addresses. Each Station ID is included in MAP information which is resource allocation information of each base station or polling information (corresponding to CF-Poll according to IEEE 802.11 or GTS descriptor in a beacon according to IEEE 802.15.4).

Similar to the first index value, a coding rate is a total coding rate based on a combination of an applicable modulation method and error correction code which matches communication quality measured by the baseband signal processing unit 23.

The second index value is effective particularly when resources are equally and fixedly distributed to each terminal.

Further, when allocation of a DS (Downstream) period and an US (Upstream) period is different per cell, a ratio of the number of DS and US symbols with respect to the number of symbols per frame may be further multiplied on the second index value calculated according to the above-described equation.

When, for example, one frame includes 26 symbols and 13 symbols are allocated to the US, it is possible to perform evaluation which focuses on an US expected transmission rate by multiplying ½ on the second index value.

The base station selecting unit 26 calculates the second index value per connectable cell, selects a cell of the highest second index value and notifies the main control unit 25 of the cell.

In addition, at least statistics information of several frames is necessary to calculate the first index value and the second index value, yet it is possible to arbitrarily set a period of the several frames. Further, it is possible to arbitrarily set which one of the first index value and the second index value to use according to a cell resource distribution method to estimate an expected transmission rate. Which one of the first index value and the second index value to use is set to the base station selecting unit 26. For example, in case of a system which fixedly allocates resources to terminals and gives a priority to communication which has started earlier, since it is necessary to obtain resources which each terminal needs from available resources, the first index value is suitable. In case of a system which equally allocates resources to terminals, the second index based on the number of terminals is suitable.

Figure 3:
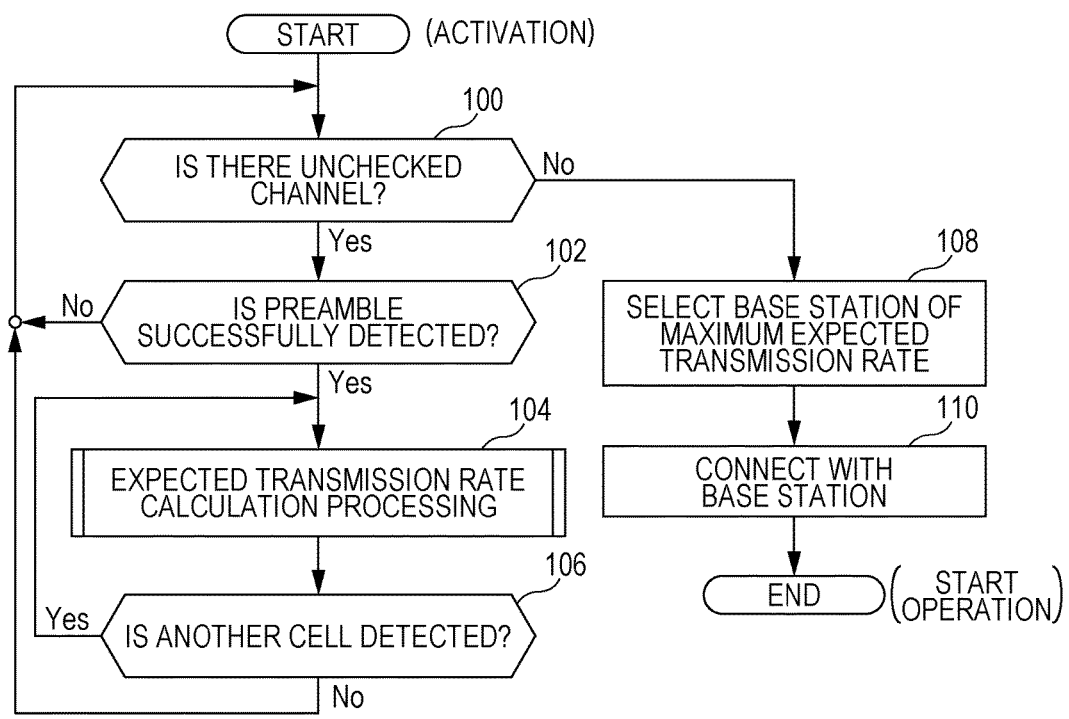
FIG. 3 is a flowchart that illustrates a schematic operation of selecting a base station during activation of a terminal according to the present embodiment.

<Schematic Operation of Selecting Base Station During Activation: FIG. 3>

Next, a schematic operation of selecting a base station during activation of the terminal according to the present embodiment will be described with reference to FIG. 3. FIG. 3 is a flowchart that illustrates the schematic operation of selecting a base station during activation of the terminal according to the present embodiment. In addition, hereinafter, an operation during activation of the terminal 16 which receives signals from both of the base station 11 and the base station 12 in FIG. 1 will be described.

The terminal 16 searches base stations in all predetermined channels after activation.

Each base station is searched by detecting a superframe preamble transmitted at a head of each superframe while sweeping a frequency in an arbitrary order.

A superframe is a unit obtained by grouping 10 msec frames every 16 frame, and each base station broadcasts basic information of each base station per superframe.

Thus, the terminal 16 recognizes the frequency used by the base station, and establishes synchronization.

As illustrated in FIG. 3, after activation, the terminal 16 determines whether or not base stations in all channels have been searched, i.e., whether or not there is an unchecked channel (100).

When there is the unchecked channel (in case of Yes), the terminal 16 determines for each channel whether or not a super preamble has been successfully detected (102).

More specifically, the terminal 16 tries to receive a superframe preamble, and, when reception power is a threshold or more, it is determined that the superframe preamble has been successfully detected. Then, reception power and/or a CINR are calculated.

In case where the super preamble has not been successfully detected in the processing 102 (in case of No), the terminal 16 moves to the processing 100 to search base stations for a next channel.

Further, in case where the super preamble has been successfully detected in the processing 102 (in case of Yes), the base station is a connectable base station.

Furthermore, the terminal 16 performs expected transmission rate calculation processing of calculating an index value of an expected transmission rate for each searched base station (104). The index value of the expected transmission rate is one preset index value of the above-described first index value and second index value. The terminal 16 associates the calculated index value as the expected transmission rate with information of each base station to store.

As described above, the expected transmission rate is a value which reflects communication quality and a cell load status, and, as the expected transmission rate is higher, communication quality which the user experiences is better.

The expected transmission rate calculation processing will be described in detail below.

Further, the terminal 16 determines whether or not a channel is shared by another cell, i.e., whether or not another cell is detected in this channel (106). A Superframe Control Header (SCH) which is a control message from a base station indicates an operating frame (active frame) as Frame Allocation Map in a superframe including 16 frames, and the terminal 16 uses this information.

More specifically, when there is an inactive frame (idle frame) among the 16 frames, it is likely that an idle frame is operated in another cell (a channel is shared by way of time division). Hence, the terminal 16 checks whether or not a superframe preamble is not received from another base station when an existence of an idle frame is checked based on the SCH.

Further, in case where another cell has been detected in the processing 106 (in case of Yes), the terminal 16 moves to the processing 104 to perform expected transmission rate calculation processing on the another cell.

Furthermore, in case where the another cell has not been successfully detected in the processing 106 (in case of No), the terminal 16 moves to the processing 100 to search base stations for a next channel.

Still further, when it is determined in the processing 100 that base stations have been searched for all channels, i.e., when there is no unchecked channel (in case of No), the terminal 16 selects a base station of a maximum expected transmission rate based on all stored index values (108) and connects to the selected base station (110). Moreover, an expected transmission rate of a connected base station is kept. Thus, the terminal 16 enters an operation start state.

That is, even in a system which does not include a handover mechanism and is not notified of availability of radio resources from each base station, the terminal 16 can select a cell which has the highest quality and larger available resources and enables high speed transmission based on an expected transmission rate matching a coding rate and a resource use status determined according to communication quality, provide good communication service and improve communication quality which the user experiences.

In the example in FIG. 1, one terminal connects to the base station 11, two terminals connect to the base station 12, and therefore when communication quality is at the same level, the terminal 16 connects to the base station 11. Connection is established according to IEEE 802.22 similar to the conventional system.

Figure 4:
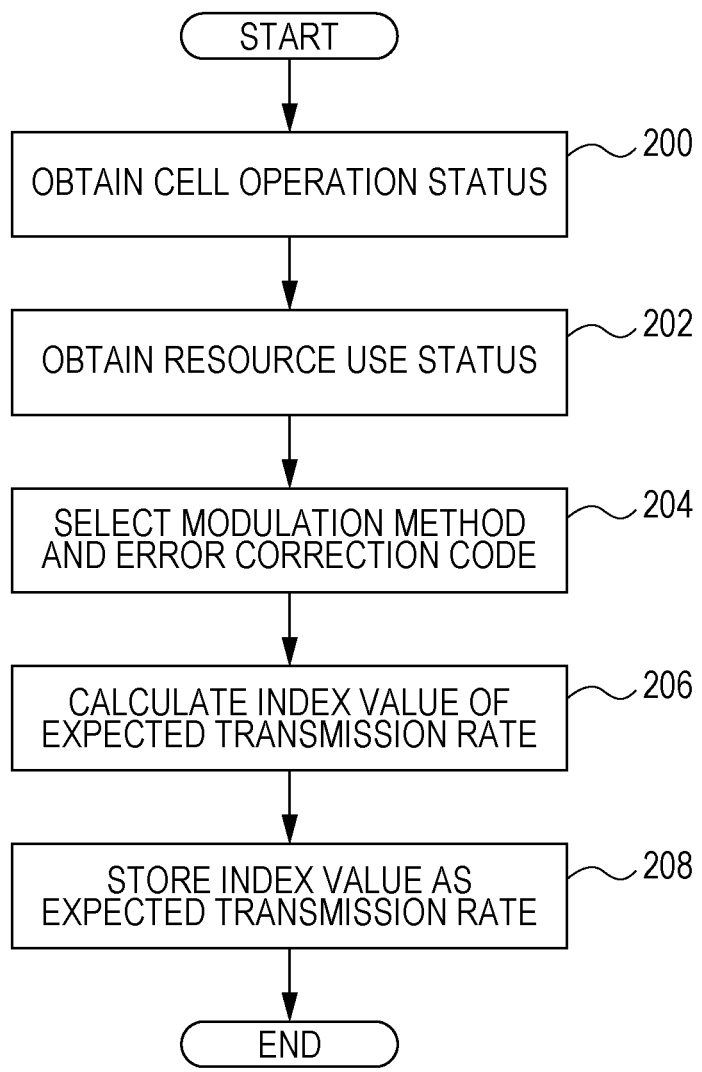
FIG. 4 is a flowchart that illustrates expected transmission rate calculation processing illustrated in processing 104 in FIG. 3.

<Expected Transmission Rate Calculation Processing: FIG. 4>

Next, the expected transmission rate calculation processing in the processing 104 in FIG. 3 will be more specifically described with reference to FIG. 4. FIG. 4 is a flowchart that illustrates the expected transmission rate calculation processing illustrated in the processing 104 in FIG. 3.

As illustrated in FIG. 4, in the expected transmission rate calculation processing, the terminal 16 obtains a cell operation status for each searched base station (200). More specifically, the terminal 16 obtains minimum information which is necessary to start communication with each base station, from an SCH, a Downstream Map (DS MAP), an Upstream Map (US MAP), a DS Channel Descriptor (DCD), a US Channel Descriptor (UCD) and the like which are control messages transmitted from each base station. Information to obtain is, for example, a duration of a period of a DS/US, a modulation method and a coding method.

Next, the terminal 16 obtains a resource use status of a cell (cell load status) of each base station (202).

More specifically, the terminal 16 obtains an average available resource amount in a frame included in the DS MAP and the US MAP and the number of terminals in a certain period as the resource use status.

Further, the terminal 16 selects a combination of an applicable modulation method and coding method using an error correction code based on reception power or a CINR, and calculates a total coding rate determined based on the combination (204).

Further, the terminal 16 calculates an index value of an expected transmission rate (206). The index value of the expected transmission rate is set one of the above-described first index value and second index value.

The terminal 16 calculates an index value of an expected transmission rate according to average available resource amount×coding rate when using the first index value, and calculates the index value according to (1/the number of terminals)×coding rate when using the second index value.

Further, the terminal 16 associates the calculated index value as the expected transmission rate with information of the base station to store (208). Thus, the expected transmission rate calculation processing of the terminal according to the present embodiment is performed.

Figure 5:
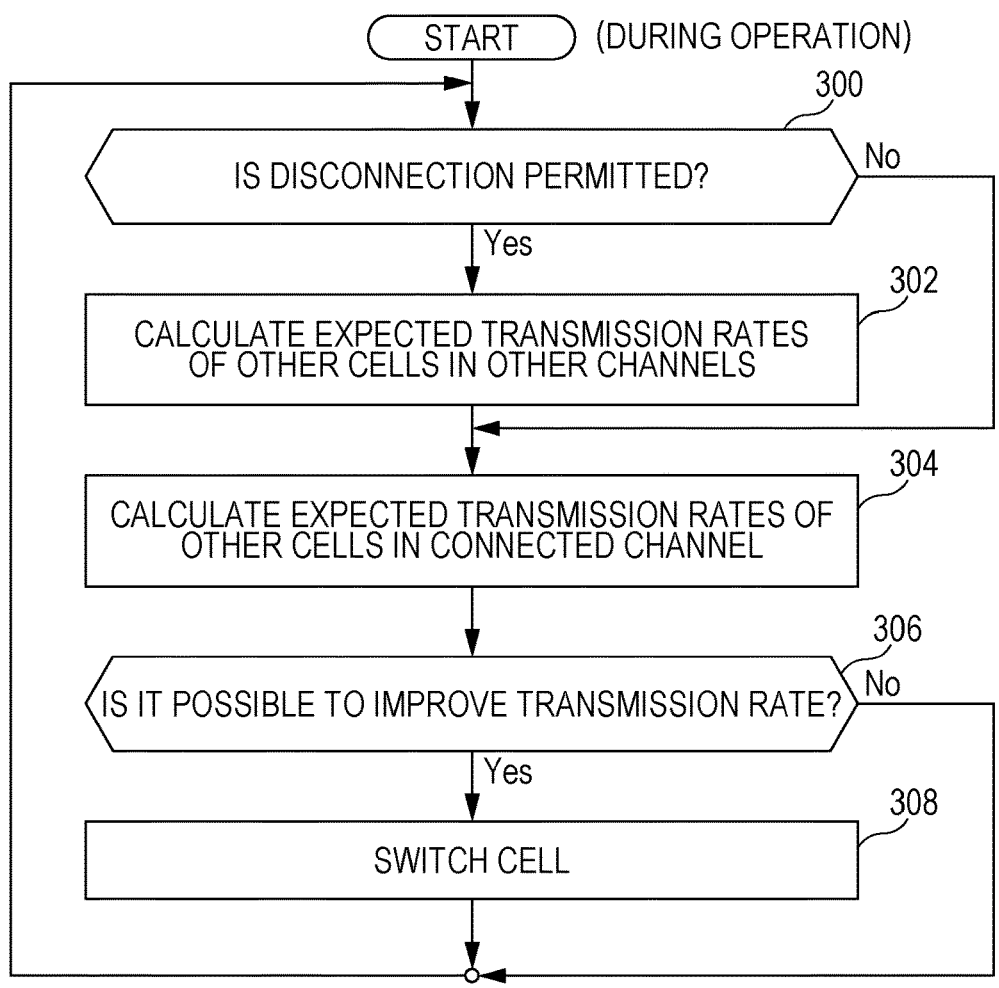
FIG. 5 is a flowchart that illustrates an operation after the terminal according to the present embodiment is operated.

<Processing after Operation Starts: FIG. 5>

It is likely that, even when a terminal establishes connection with one of base stations once and starts operating, a load status of a connected cell changes, and the terminal does not satisfy required quality. The terminal according to the present embodiment performs processing of monitoring an expected transmission rate after starting the operation, too, and switching connection to a cell which provides a maximum transmission rate at all times.

Processing after the terminal according to the present embodiment starts operating will be described with reference to FIG. 5. FIG. 5 is a flowchart that illustrates an operation after the terminal according to the present embodiment is operated.

As illustrated in FIG. 5, when selecting a base station during activation and starting an operation, the terminal 16 determines whether or not disconnecting current connection is permitted (300).

This is because it is desirable to avoid a disconnected state as much as possible depending on an application or a communication status of a terminal, and therefore the terminal determines whether or not disconnection is permitted in case where base stations are searched in channels different from a connected channel. Methods for determining whether or not disconnection is permitted include a method for causing an application to make such determination and a method for forcibly searching base stations by a user's operation.

When a type of a currently communicating application permits disconnection or when communication is not performed, i.e., when it is determined that disconnection is permitted in the processing 300 (in case of Yes), the terminal 16 searches other cells in other channels and calculates expected transmission rates of all searched cells (302). The calculated expected transmission rates are stored together with information of each base station. Each expected transmission rate is calculated according to processing in FIG. 4.

Further, the terminal 16 searches other cells in a connected channel, calculates expected transmission rates of the searched cells according to the processing in FIG. 4 and associates the expected transmission rates with information of a base station to store (304).

Furthermore, when disconnection is not permitted in the processing 300 (in case of No), the terminal 16 moves to the processing 304 to search other cells which use a currently connected channel by way of time division, and calculates expected transmission rates of the other cells if there are the other cells.

According to the processing 304, it is not necessary to switch a channel to measure reception power or a CINR, so that it is possible to prevent disconnection of communication during measurement.

Further, the terminal 16 compares the kept expected transmission rate of the currently connected cell and the expected transmission rates of the other cells, and determines whether or not it is possible to improve the transmission rate, i.e., whether or not there are the other cells whose expected transmission rates are higher than that of the currently connected cell (306).

When it is estimated in the processing 306 that it is possible to improve the transmission rate compared to a current transmission rate, the terminal 16 switches the cell (308). In addition, a disconnection period taken to switch a cell is a short disconnection period unlike a period taken to perform base station search for a certain period of time in which index values can be calculated for a plurality of channel states. Therefore, it is assumed that many applications can permit a disconnected state while a cell is switched. When disconnection in a switch period is not permitted, switch stands by until communication of an application is finished or current communication quality deteriorates and no longer satisfies quality which an application demands.

According to IEEE 802.22, processing for handover is not defined. Therefore, the terminal 16 forcibly gets out of a currently connected cell, and connects to a new cell. After connection is established, the terminal 16 returns to an operation start state and continuously monitors other cells. As long as the terminal 16 refers to a common DHCP (Dynamic Host Configuration Protocol) server between the currently connected cell and the new cell, an IP address of the terminal 16 does not change, either.

The processing in FIG. 5 may be performed on a regular basis or may be executed while communication is not performed. Thus, the processing after the terminal according to the present embodiment starts operating is performed.

Thus, in the system which does not include a handover mechanism and is not notified of availability of radio resources from each base station, the terminal according to the present embodiment can flexibly select a base station of the highest transmission rate and switch connection according to communication quality and a load status of each cell even after the terminal starts operating, easily support an increase or a decrease in base stations, provide good communication service and improve quality of experience of the user.

Effect of Embodiment

According to the wireless communication terminal according to the embodiment of the present invention, in a cellular system which does not include a handover mechanism and is not notified of availability of radio resources from each base station, during activation of the terminal, the baseband signal processing unit 23 calculates reception power or communication quality such as a CINR of each connectable base station. The MAC processing unit 24 intercepts resource allocation information and polling information from the base station, and estimates a cell resource use status based on the resource allocation information and the polling information. The base station selecting unit 26 calculates an index value of an expected transmission rate according to the communication quality and the resource use status, and selects a base station of a maximum index value of the expected transmission rate. The main control unit 25 connects to the base station. Consequently, it is possible to provide an effect that even in a fixed system, the wireless communication terminal can flexibly select a base station taking into account communication quality and the resource use status, provide good communication service and improve quality of experience of the user.

Further, according to the terminal according to the present embodiment, the base station selecting unit 26 uses average available resource amount×coding rate or (1/the number of terminals per unit time)×coding rate as an index value of an expected transmission rate. Consequently, it is possible to provide an effect that the terminal can calculate an expected transmission rate of a base station by a simple arithmetic operation and select an optimal base station.

Further, according to the terminal according to the present embodiment, after the terminal connects with a base station and starts operating, if there are other connectable base stations, the base station selecting unit 26 calculates expected transmission rates of these base stations. When an expected transmission rate is higher than that of the currently connected base station, the main control unit 25 switches connection from the currently connected base station to the base station of the higher expected transmission rate. Consequently, it is possible to provide an effect that, even during an operation, the terminal can monitor resource use statuses of connectable base stations, select an optimal base station, switch connection, provide good communication service and further improve quality of experience of the user.

In addition, an IEEE 802.22 system has been described as an example. It is possible to apply the same idea as the above-described idea to other systems which notify resource allocation information. It is possible to estimate a cell load status by using, for example, GTS (Guaranteed Time Slots) descriptor included in a CF-Poll message of polling according to IEEE 802.11 or a beacon message of polling according to IEEE 802.15.4. Further, it is possible to calculate an expected transmission rate similar to the present embodiment by combining the GTS descriptor with a coding rate based on communication quality to use to determine a connection destination.

Furthermore, when connection is lost for some reason during multistage relay such as BS (base station) 1-CPE (terminal) 1-BS 2-CPE 2 which uses relay stations which connect the CPE 1 and the BS 2 via cables, the terminal according to the present embodiment is applicable as a mechanism, too, which prevents the CPE from being connected to a wrong BS.

When, for example, a first hop (BS 1-CPE 1) is disconnected, the CPE 1 obtains resource allocation information from MAP information of both of the BS 1 and BS 2, and calculates expected transmission rates.

In this example, connection with the BS 2 of a second hop has been established, and therefore the resource allocation information (average available resource amount, a terminal ID and the like) is described in the MAP information.

Meanwhile, the BS 1 of the first hop is in a disconnected state, and therefore the resource allocation information is not indicated, the BS 1 has a higher expected transmission rate and the CPE 1 can connect to the BS 1.

INDUSTRIAL APPLICABILITY

The present invention is suitable to a wireless communication terminal which can flexibly select and connect to a base station according to communication quality and a load status even in a wireless communication system which does not include a handover mechanism.

What is claimed is:

1. A wireless communication terminal in a wireless communication system which does not include a handover function, the wireless communication terminal comprising:
   a baseband signal processing unit which calculates a communication quality based on a received signal from a connectable base station;
   a MAC processing unit which obtains an average available resource amount as a resource use status from MAC information received from the connectable base station;
   a base station selecting unit which calculates a first index value as an index value of an expected transmission rate by multiplying a coding rate and the average available resource amount, and selects a base station of a maximum first index value as a connection destination,
      wherein the expected transmission rate is expected when connection to the selected base station is established and the coding rate is a combination of a modulation method and a coding method matching the communication quality; and
   a main control unit which connects to the selected base station.

2. A wireless communication terminal in a wireless communication system which does not include a handover function, the wireless communication terminal comprising:
   a baseband signal processing unit which calculates a communication quality based on a received signal from a connectable base station;

a MAC processing unit which obtains a number of terminals per unit time as a resource use status from MAC information received from the connectable base station;

a base station selecting unit which calculates a first index value as an index value of an expected transmission rate by dividing a coding rate by the number of terminals, and selects a base station of a maximum first index value as a connection destination, wherein the expected transmission rate is expected when a connection to the selected base station is established and the coding rate is a combination of a modulation method and a coding method matching the communication quality; and a main control unit which connects to the selected base station.

3. The wireless communication terminal according to claim 1, wherein in a state where the connection to the connected base station is established, the base station selecting unit further calculates another index value of another expected transmission rate for another connectable base station other than the connected base station, and selects the another base station as another connection destination when the another expected transmission rate of the another base station is higher than the expected transmission rate of the connected base station, and the main control unit further disconnects the connection with the connected base station, and connects to the another base station.

* * * * *